United States Patent [19]
Ohtomo et al.

[11] Patent Number: 5,907,907
[45] Date of Patent: Jun. 1, 1999

[54] LASER LEVELING SYSTEM

[75] Inventors: Fumio Ohtomo; Satoshi Hirano; Kazuki Osaragi; Jun-ichi Kodaira; Ken-ichiro Yoshino, all of Tokyo-to, Japan

[73] Assignee: Kabushiki Kaisha TOPCON, Tokyo-To, Japan

[21] Appl. No.: 08/784,810

[22] Filed: Jan. 16, 1997

[30] Foreign Application Priority Data

Jan. 31, 1996 [JP] Japan .................................. 8-037458

[51] Int. Cl.⁶ .................................................. G01B 11/26
[52] U.S. Cl. ................................ 33/291; 33/281; 33/286; 33/293; 33/DIG. 21
[58] Field of Search .............................. 33/291, 276, 281, 33/282, 283, 285, 286, 290, 292, 293, DIG. 21

[56] References Cited

U.S. PATENT DOCUMENTS

| | | | |
|---|---|---|---|
| 3,471,234 | 10/1969 | Studebaker | 33/285 |
| 3,988,837 | 11/1976 | Benson | 33/286 |
| 4,718,171 | 1/1988 | Schlemmer et al. | 33/290 |
| 4,988,192 | 1/1991 | Knittel | 33/281 |
| 5,218,770 | 6/1993 | Toga | 33/276 |
| 5,539,990 | 7/1996 | Le | 33/281 |
| 5,689,330 | 11/1997 | Gerard et al. | 33/291 |

FOREIGN PATENT DOCUMENTS 0 631 110  12/1994  European Pat. Off. .

*Primary Examiner*—Christopher W. Fulton
*Attorney, Agent, or Firm*—Nields, Lemack & Dingma

[57] ABSTRACT

The present invention provides a laser leveling system for forming a reference line or a reference plane by a laser beam. The laser leveling system comprises a laser light emitting means for emitting a laser beam, a projection optical system for projecting the laser beam irradiated from the light emitting means, a rotating unit for rotating the light beam projected by the projection optical system, and a leveling means for tilting the rotating unit, whereby a horizontal reference plane and a vertical reference plane are formed by the light beam, and a reference irradiation spot is formed on the horizontal reference plane or on the vertical reference plane.

14 Claims, 13 Drawing Sheets

LASER LEVELING SYSTEM

BACKGROUND OF THE INVENTION

The present invention relates to a laser leveling system, which irradiates a laser beam in vertical or horizontal directions and performs scanning while the laser beam is irradiated to form a reference line or a reference plane.

To install a partition in a building or to mount lighting fixtures such as fluorescent light on a ceiling, positioning is performed according to a marking line, which is marked on a floor, and a laser leveling system is used to project the position indicated by the marking line on a ceiling surface, a wall surface, etc.

The laser leveling system is to form a reference line or a reference plane. Thus, position, posture, etc. of the laser leveling system to be installed must be accurately aligned with a predetermined position or posture.

FIG. 15 shows a conventional type laser leveling system.

Inside a main unit 1, there are provided a laser beam emitting means, a rotary driving unit, a controller, etc. On the main unit 1, a rotating unit 2 is installed, and a laser beam is irradiated from the rotating unit 2, and scanning by the laser beam is performed by rotation of the rotating unit 2. The main unit 1 is mounted on a base plate 5 via at least two leveling screws 3 and 4. By adjusting the leveling screws 3 and 4, it is possible to adjust tilting of a rotation axis of the rotating unit 2 to a predetermined condition. On lateral sides of the main unit 1, bubble tubes 8 and 9 are provided so that these bubble tubes can be seen from outside. To adjust tilting, at least one of the leveling screws 3 and 4 is turned, and tilting of the main unit 1 is adjusted according to whether the leveling screws 3 or 4 are moved in or out. Further, tilting adjustment by the leveling screws 3 and 4 is carried out while watching the bubble tubes 8 and 9.

Because the movement of the leveling screws i.e. height adjustment is converted to tilting adjustment, a tilting direction and amount of tilting cannot be determined intuitively, and some skill is required for the adjustment. Also, tilting is judged by watching position of air bubbles in the bubble tubes, and this results in wide variations due to individual difference of the operator. This also requires some skill in determining with high accuracy.

Further, in case a vertical reference plane is formed by rotary scanning, an auxiliary tool is used, and the laser leveling system is laid horizontally so that the rotation axis of the rotating unit 2 is directed in a horizontal direction. In this case, it is necessary to adjust a direction of the vertical plane. Unless the leveling screws are positioned perpendicularly to the adjusting direction, it is very difficult to adjust the direction by means of the leveling screws. For this reason, it is necessary to provide the auxiliary tool with a adjusting means, etc. In case it is tried to align the laser beam irradiated for rotary scanning with the marking line on the floor, it is difficult to align because the laser beam is linear. Further, in case locus of rotary scanning of the laser beam is at a separate position, and it is difficult to align the laser beam visually while operating at the main unit side. It is necessary to watch the bubble tubes from above, but if the leveling system is placed at a position higher than the line of sight, it is very difficult to perform adjustment.

SUMMARY OF THE INVENTION

It is an object of the present invention to provide a laser leveling system, by which it is possible to easily perform posture adjustment of the system, position alignment of a laser beam and positioning on a ceiling. The laser leveling system of the present invention comprises a laser light emitting means for emitting a laser beam, a projection optical system for projecting the laser beam irradiated from the light emitting means, a rotating unit for rotating the light beam projected by the projection optical system, and a leveling means for tilting the rotating unit, whereby a horizontal reference plane and a vertical reference plane are formed by the light beam, and a reference irradiation spot is formed in the horizontal reference plane or in the vertical reference plane. Also, the laser leveling system of the present invention comprises a laser light emitting means for emitting a laser beam, a projection optical system for projecting the laser beam irradiated from the light emitting means, a rotating unit for rotating the light beam projected from the projection optical system, a light receiving means for receiving the laser beam reflected from an object reflector arranged on the optical path of the projected laser beam, a signal processor for detecting the object reflector by a signal from the light receiving means, and a leveling means for tilting the rotating unit, whereby a horizontal reference plane and a vertical reference plane are formed by the light beam, and a reference irradiation spot is formed on the horizontal reference plane or on the vertical reference plane. Further, the laser leveling system of the present invention comprises a tilting display means interlocked with the leveling means and used for indicating tilting of the rotating unit. Also, the laser leveling system of the present invention is designed in such manner that the leveling means is a tilting mechanism designed to tilt in two axial directions, and a rotation axis of an adjusting knob is set in parallel to a rotation axis of tilting. The laser leveling system of the present invention is designed in such manner that the reference irradiation spot is formed by a slit arranged on the optical path of the rotating light beam. The laser leveling system of the present invention is comprises a rotation angle detecting means arranged on the rotating unit and a control means for controlling light emission based on a detection signal from the rotation angle detecting means, and a spot is formed in a rotation plane of the laser beam by the control means controlling the light emitting means. Also, the laser leveling system of the present invention comprises the rotation angle detecting means and the control means, and the rotating unit is operated for reciprocal scanning or stopped by the control means based on a signal from the rotation angle detecting means. The laser leveling system of the present invention is designed in such manner that an angle compensator is provided to maintain the light beam irradiated from the light emitting means in vertical or horizontal directions regardless of tilting of the entire system. Also, the laser leveling system of the present invention is designed in such manner that a laser beam running perpendicularly to the horizontal reference plane or the vertical reference plane is irradiated. The laser leveling system of the present invention is designed in such manner that the rotating unit is controlled based on a signal from the light receiving means. The laser leveling system of the present invention is designed in such manner that a display means is provided to indicate information from the object reflector detected by the signal processor. Also, the laser leveling system of the present invention is designed in such manner that the display means indicates the operating direction of the leveling means. The laser leveling system of the present invention is designed in such manner that a frame grip is provided around the rotating unit to protect the rotating unit. Further, the laser leveling system of the present invention is designed in such manner that a wall mount is provided, which has a clamping means for clamping a fixed object and a guiding means for supporting the main unit to move up and down so that a laser beam can be irradiated for rotary scanning in a horizontal direction. The laser leveling system of the present invention comprises a floor mount which supports the main unit so that a laser beam can be irradiated in a vertical direction for rotary scanning, and the floor mount has at least one leveling screw. Further, the laser leveling system of the present invention is designed in such manner that bubble tubes are arranged on the main unit, mirrors are provided opposite to the bubble tubes, and the bubble tubes can be visually checked directly or through the mirrors. Therefore, in case the laser leveling system is to be installed or in case the irradiating direction of the laser beam is to be adjusted or changed after the laser leveling system has been installed, the present invention contributes to easy operation because the adjusting direction is consistent with the operating direction. Because a display unit is provided for indicating the adjustment condition near the adjusting knob, an operator can easily confirm the operating condition visually, and this contributes to improvement of operability.

DETAILED DESCRIPTION OF THE PREFERRED EMBODIMENTS

Figure 1:
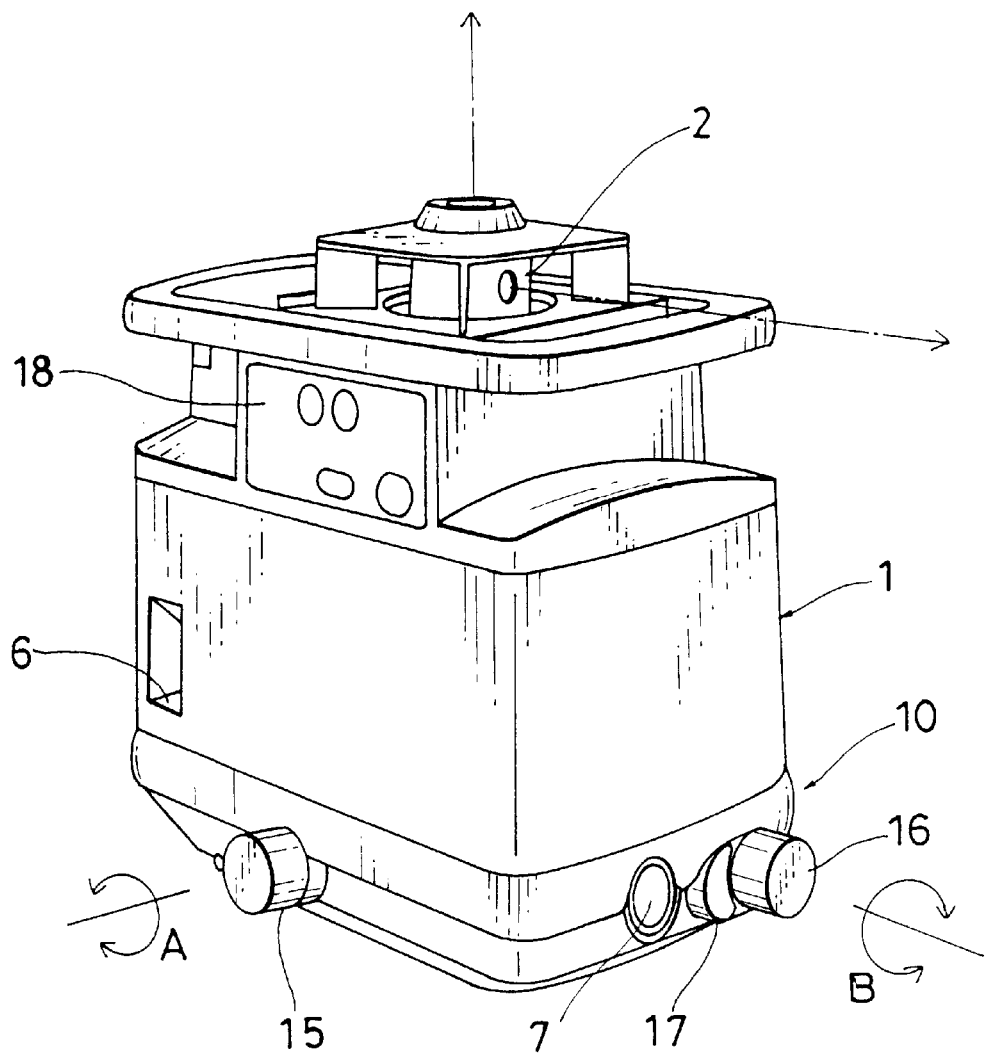
FIG. 1 is a perspective view of an embodiment of the present invention.

In the following, description will be given on embodiments of the present invention referring to the drawings.

Figure 15:
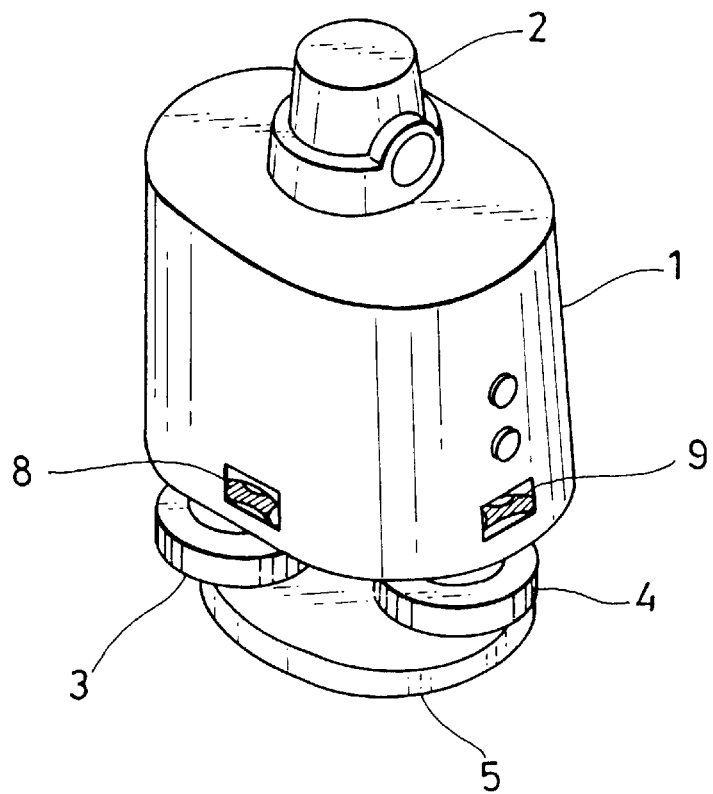
FIG. 15 is a perspective view of a conventional type system.

In FIG. 1, the same component as in FIG. 15 is referred by the same symbol.

Figure 2:
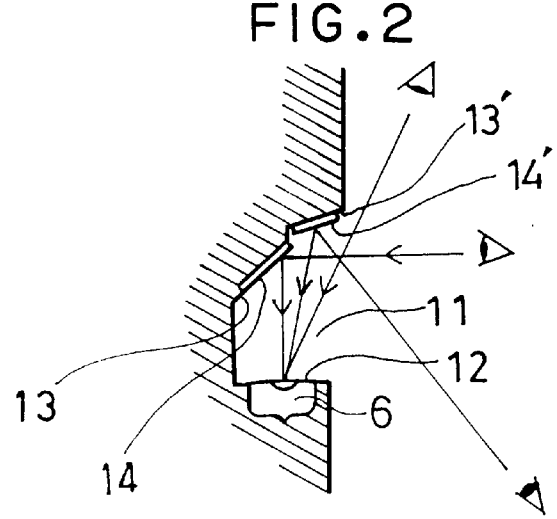
FIG. 2 is a partial cross-sectional view of a circular bubble tube in the above embodiment.

A main unit 1 is mounted on a leveling base 10. On top of the main unit 1, a rotating unit 2 is rotatably mounted, and a laser beam is emitted from lateral sides and an upper end surface of the rotating unit 2. On the main unit 1, a circular bubble tube 6 for horizontal direction and a circular bubble tube 7 for vertical direction are provided. The circular bubble tube 6 is provided on a lateral side of the main unit 1 and, as seen in FIG. 2, the circular bubble tube 6 is placed in a recess 11 formed on the main unit 1. The recess 11 comprises a planar sector 12 where the circular bubble tube 6 is mounted, a slant plane 13 arranged at face-to-face to the planar sector 12, and another slant plane 13' having different tilt angle from that of the slant plane 13. On the slant plane 13, a mirror 14 is mounted, and a mirror 14' is mounted on the slant plane 13'. The circular bubble tube 6 can be watched from above or from lateral side or from below via the mirrors 14 or 14'. The circular bubble tube 7 is provided on a plane, which runs perpendicularly to the side where the circular bubble tube 6 is provided, and it is used when the system is installed at a vertical position.

As to be described later, the leveling base 10 has a tilting base, which can be tilted in two directions, and there are provided adjusting knobs 15 and 16 having axes perpendicular to each other. A rotating direction of each of the adjusting knobs 15 and 16 is closely associated with a moving direction of air bubbles in the circular bubble tube 6. By adjusting the circular bubble tube 6, posture of the laser leveling system can be roughly adjusted. After the rough adjustment, a rotary operation plane of the laser beam is adjusted in horizontal or vertical directions by a tilting compensation mechanism described later. In case the system is installed in a vertical position, posture is roughly adjusted by the adjusting knob 15 and by a leveling screw 86 mounted on a floor mount 85. The adjusting knob 16 is used to adjust a vertical rotary irradiating direction.

In FIG. 1, reference numeral 18 represents an operation panel where scanning buttons, display unit, etc. are arranged.

In the following, description will be given on basic arrangement of the main unit 1 and on arrangement of the leveling base 10.

Figure 3:
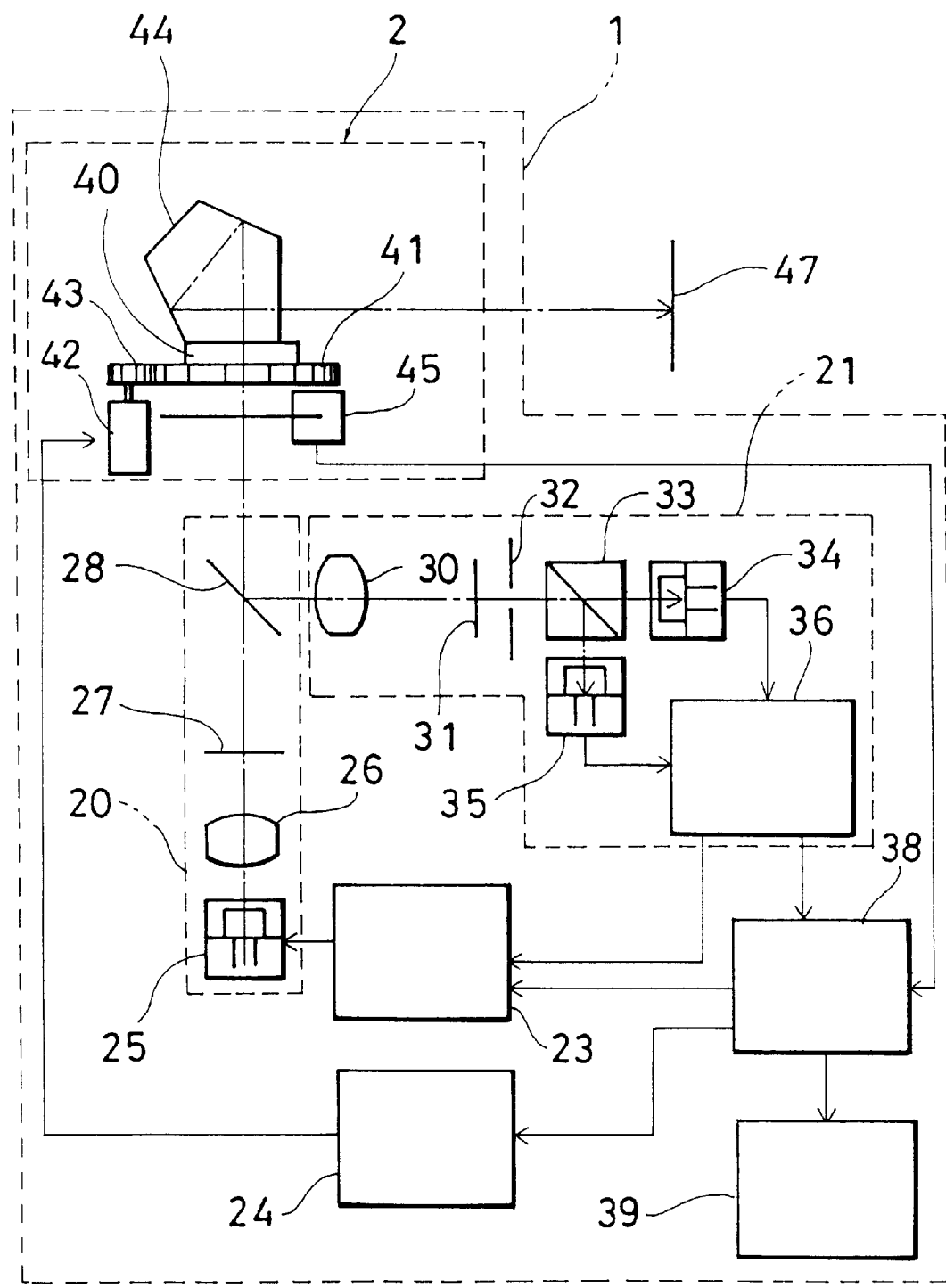
FIG. 3 is a schematical block diagram of the above embodiment.

First, basic arrangement of the main unit 1 will be described referring to FIG. 3.

In the figure, the same component as in FIG. 1 is referred by the same symbol. The main unit 1 comprises a light emitter 20, a rotating unit 2, a reflection light detector 21, a control unit (CPU) 38, a light emitting element driving unit 23, a motor driving unit 24, and a display unit 39.

First, description will be given on the light emitter 20.

On an optical axis of a laser diode 25, which emits linearly polarized irradiation light beam, a collimator lens 26, a first λ/4 birefringence member 27, and a perforated mirror 28 are arranged in this order as seen from the laser diode 25. The laser beam emitted from the laser diode 25 is linearly polarized irradiation light beam, and this light beam is turned to parallel beams by the collimator lens 26 and is converted to a circularly polarized light by the first λ/4 birefringence member 27. The circularly polarized irradiation light beam is irradiated to the rotating unit 2 via the perforated mirror 28.

Description is now given on the rotating unit 2. The rotating unit 2 deflects an optical axis of the polarized irradiation light beam emitted from the light emitter 20 by 90° and irradiates it, and rotates the light beam for rotary scanning.

A rotation support member 40 is rotatably arranged and a scanning gear 41 is engaged on the rotation support member 40. A driving gear 43 mounted on a scanning motor 42 is engaged with the scanning gear 41 so that the rotation support member 40 is rotated around the optical axis of the light emitter 20 by the scanning motor 42.

On the rotation support member 40, a pentagonal prism 44 for splitting the upper vertical laser beam to a transmitting light and a reflecting light is arranged. Thus, the laser beam emitted from the light emitter 20 is irradiated in a horizontal direction, and the laser beam passing through the pentagonal prism 44 is irradiated in an upward direction as the upper vertical laser beam. Rotating status of the rotation support member 40 is detected by an encoder 45, and a detection signal of the encoder 45 is inputted to the control unit (CPU) 38.

The laser beam irradiated from the rotating unit 2 passes through an object reflector 47 for scanning. It is so arranged that when the laser beam passes through, the polarized reflection light beam coming from the object reflector 47 enters the rotating unit 2. The polarized reflection light beam entering the pentagonal prism 44 is deflected toward the perforated mirror 28, and the polarized reflection light beam is irradiated to the reflection light detector 21 via the perforated mirror 28.

Next, description will be given on the reflection light detector 21.

On the reflection light optical axis of the perforated mirror 28, a condenser lens 30, a second $\lambda/4$ birefringence member 31, a pinhole 32, a polarization beam splitter 33, and a first photoelectric converter 34 are arranged in this order as seen from the perforated mirror 28. On the reflection light optical axis of the polarization beam splitter 33, a second photoelectric converter 35 is arranged. Output from each of the first photoelectric converter 34 and the second photoelectric converter 35 is inputted to a reflection light detection circuit 36.

The polarization beam splitter 33 splits the polarized reflection light beam entering the reflection light detector 21 and irradiates the split light beams to the first photoelectric converter 34 and the second photoelectric converter 35. The second $\lambda/4$ birefringence member 31 and the polarization beam splitter 33 are arranged in such manner that the light beam having the same direction of polarization as the polarized reflection light beam, which has been emitted from the light emitter 20 and has returned to the main unit after passing through the $\lambda/4$ birefringence member twice, is irradiated to the first photoelectric converter 34, and that the polarized reflection light beam which returned to the main unit with the same direction of polarization as that of the polarized irradiation light beam emitted from the light emitter 20 is irradiated to the second photoelectric converter 35.

Figure 4:
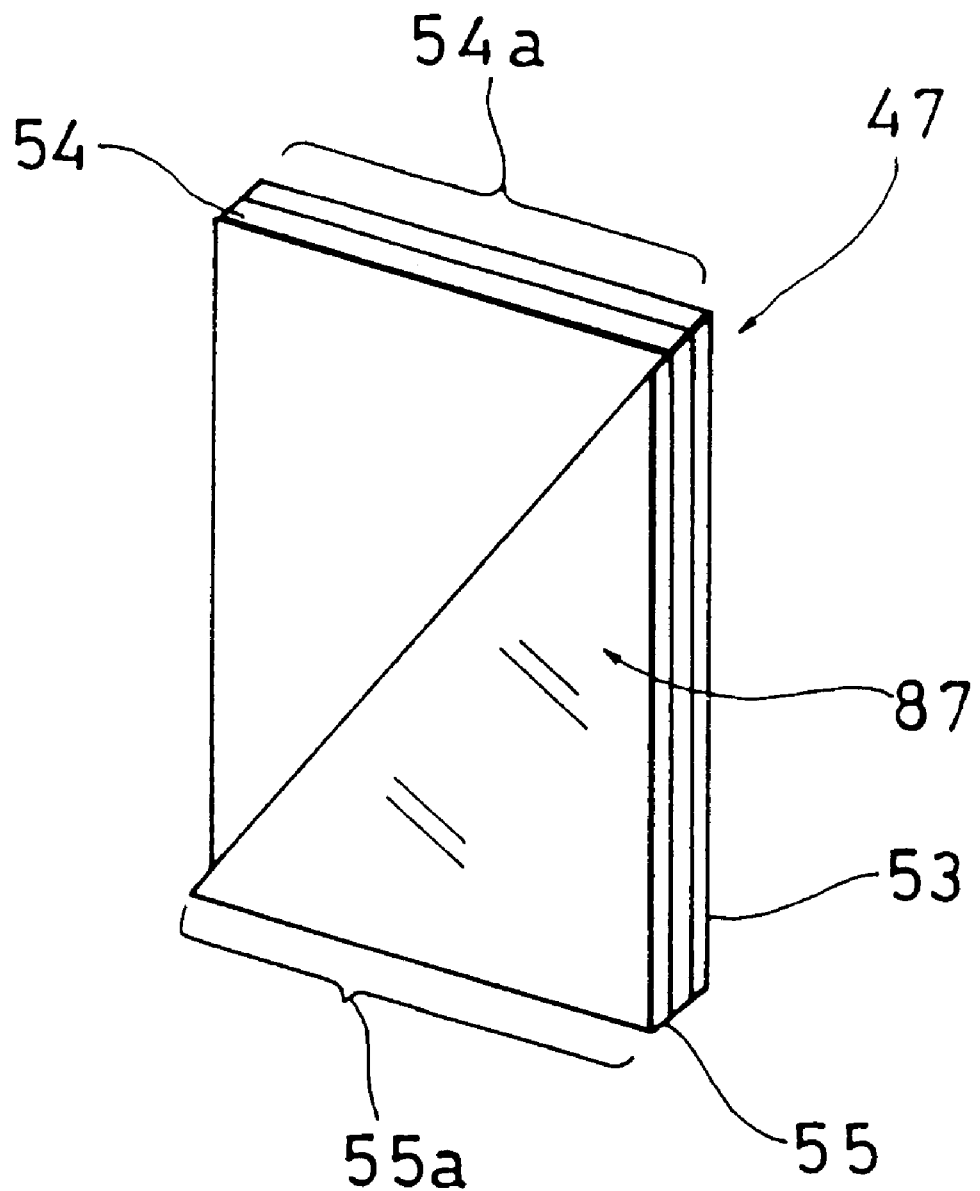
FIG. 4 is a perspective view of an object reflector in the above embodiment.

Next, description will be given on the object reflector 47 referring to FIG. 4.

A reflection layer 54 is formed on a base plate 53, and the reflection surface is divided into two parts along a diagonal line from right upper corner to left lower corner in the figure, and a $\lambda/4$ birefringence member 55 is attached on the right half of the reflection surface. An exposed portion on the left half of the reflection layer 54 is a polarization maintaining reflection sector 54a, which reflects the incident light beam while maintaining the direction of polarization, and the right half of the reflection layer 54 where the $\lambda/4$ birefringence member 55 is attached is a polarization converting reflection sector 55a, which reflects the light beam by converting the direction of polarization. Widths of the polarization maintaining reflection sector 54a and the polarization converting reflection sector 55a are determined in such relationship that the width of the polarization maintaining reflection sector 54a is linearly decreased from above toward below, and that the width of the polarization converting reflection sector 55a is linearly increased. In FIG. 4, the polarization maintaining reflection sector 54a and the polarization converting reflection sector 55a are divided by the diagonal line on the reflection layer 54, while the mode of division is not limited to this. The reflection layer 54 is made of a retro reflection material, and a plurality of very small corner cubes or spherical reflectors, etc. are arranged on it. As described above, the $\lambda/4$ birefringence member 55 has such function that the polarized reflection light beam causes a phase difference by $\lambda/2$ with respect to the incident light beam. Therefore, the reflection light beam passes through the $\lambda/4$ birefringence member 55 twice compared with the incident light beam. When a circularly polarized light enters, the reflection light is circularly polarized light in reverse rotation, and when a linearly polarized light enters, the reflection light has a polarizing plane perpendicular to the incident light.

In the following, description will be given on operation and a method to detect the object reflector 47.

After being emitted from the laser diode 25, a linearly polarized irradiation light beam is turned to parallel beams by the collimator lens 26, and after passing through the first $\lambda/4$ birefringence member 27, it is turned to a circularly polarized irradiation light beam. The circularly polarized irradiation light beam passes through the perforated mirror 28, is deflected by the pentagonal prism 44 by 90°, and is irradiated from the main unit 1.

The pentagonal prism 44 is rotated by the scanning motor 42 via the driving gear 43 and the scanning gear 41. By rotation of the pentagonal prism 44, the polarized irradiation light beam is irradiated for total circumferential scanning (all-round scanning). By all-round scanning, the polarized irradiation light beam scans the object reflector 47 and the polarized reflection light beam is reflected from the object reflector 47. As a result, the polarized reflection light beam enters the pentagonal prism 44.

As described above, the object reflector 47 comprises the polarization maintaining reflection sector 54a and the polarization converting reflection sector 55a. The polarized reflection light beam reflected by the polarization maintaining reflection sector 54a is a circularly polarized light, which maintains polarization condition of the incident polarized irradiation light beam. The polarized reflection light beam reflected by the polarization converting reflection sector 55a is a circularly polarized light, which has a phase deviated by $\lambda/2$ with respect to the polarization condition of the incident polarized irradiation light beam.

The pinhole 32 has such effect that it does not allow the reflection light beam to pass, which does not face the polarized irradiation light beam and has its optical axis deviated with respect to the polarized irradiation light beam irradiated from the main unit, i.e. reflection light beam coming from an unnecessary reflector other than the object reflector 47, so that it is not irradiated to the first photoelectric converter 34 and the second photoelectric converter 35, while it allows the polarized reflection light beam, which passes through the pinhole 32 to be irradiated to the polarization beam splitter 33.

The polarization beam splitter 33 splits the light beam to polarized components, which cross each other perpendicularly. It allows the polarized reflection light beam to pass, which is similar (but having direction of polarization deviated by 180°) to the polarized irradiation light beam emitted from the laser diode 25, while it reflects the polarized reflection light beam, which has a direction of polarization deviated from that of the polarized irradiation light beam emitted from the laser diode 25 by 90°. The first photoelectric converter 34 and the second photoelectric converter 35 receive the polarized reflection light beams thus split respectively.

The light receiving conditions of the first photoelectric converter 34 and the second photoelectric converter 35 are as follows: When the polarized reflection light beam reflected from the polarization converting reflection sector 55a of the object reflector 47 enters the reflection light detector 21, the amount of light entering the first photoelectric converter 34 is more than the amount of light entering the second photoelectric converter 35 due to the relationship between the second $\lambda/4$ birefringence member 31 and the polarization beam splitter 33. When the polarized reflection light beam reflected by the reflection sector of the object reflector 47 or by an unnecessary reflector enters the reflection light detector 21, the amount of light entering the second photoelectric converter 35 is more than the amount of light entering the first photoelectric converter 34.

Therefore, by finding a difference between the polarized reflection light beam to the first photoelectric converter 34 and the polarized reflection light beam to the second photoelectric converter 35, it is possible to identify whether the incident polarized reflection light beam has been reflected by the polarization maintaining reflection sector 54a of the object reflector 47 or by the polarization converting reflection sector 55a. Further, when the condition of signals (i.e. scanning speed) of the first photoelectric converter 34 and the second photoelectric converter 35 which received the polarized reflection light beam from the object reflector 47 is maintained at a constant level, widths of the signals from the first photoelectric converter 34 and the second photoelectric converter 35 are different from each other according to the position to scan the object reflector 47. As a result, by detecting widths of the signals from the first photoelectric converter 34 and the second photoelectric converter 35 and by comparing them with each other, it is possible to judge irradiating position of the laser beam to the object reflector 47. For example, when the widths of the signals from the first photoelectric converter 34 and the second photoelectric converter 35 are equal to each other, the irradiating position of the laser beam is at the center of the object reflector 47. The above is the description on the case where the laser beam scans the center of the object reflector 47 by all-round rotation, while, by changing mode of the operation, it is possible to operate reciprocally or to stop the rotation. The shape of the object reflector is not limited to that of the object reflector 47, and the shape can be modified to change the operation.

Next, description will be given on an automatic angle compensator provided on the laser leveling system, referring to FIG. 5 and FIG. 6.

On the lower side of a liquid sealing container 102 where a transparent liquid 96 is sealed to form a free liquid surface 95, there are provided a first incident window 98, serving as the first incident means and a second incident window 99, adjacent to the first incident window 98, serving as the second incident means to lead the light beam from outside toward the transparent liquid 96. Further, a first irradiation window 100, serving as the first light irradiating means and a second irradiation window 101, serving as the second light irradiating means for irradiating the reflection light beam reflected by the free liquid surface 95 outside of the liquid sealing container 102, are provided on the liquid sealing container 102. The first irradiation window 100 is arranged at a position lateral to the second incident window 99, and the second irradiation window 101 is arranged at a position lateral to the first incident window 98.

Inside the liquid sealing container 102, a liquid movement preventer 103 is rotatably immersed in the transparent liquid 96 and the rotation axis of the liquid movement preventer 103 is precisely or roughly aligned with the plane of the free liquid surface 95. As to be described later, the liquid movement preventer 103 has a transparent liquid movement preventing plate 104 at a position slightly below the free liquid surface 95 of the transparent liquid 96, and the center of gravity of the liquid movement preventer 103 is set at such position that the liquid movement preventing plate 104 is always maintained at a horizontal position.

A projection system 105 is arranged at a position opposite to the first incident window 98 and the second incident window 99. In the projection system 105, a light source unit 106, a collimator lens 107, and a polarization beam splitter 108 are arranged in this order toward the first incident window 98, and a $\lambda/2$ wave plate 109 made of birefringence member is rotatably arranged between the polarization beam splitter 108 and the collimator lens 107. The $\lambda/2$ wave plate 109 is designed in such manner that, when y-axis of the entire system is directed in a vertical direction, the $\lambda/2$ wave plate 109 traverses the light beam from the light source unit 106 as shown in FIG. 5, and, when z-axis of the entire system is directed in a vertical direction as shown in FIG. 6, the center of gravity is deviated from the center of rotation and the $\lambda/2$ wave plate 109 is out of the optical path of the light beam.

Figure 5:
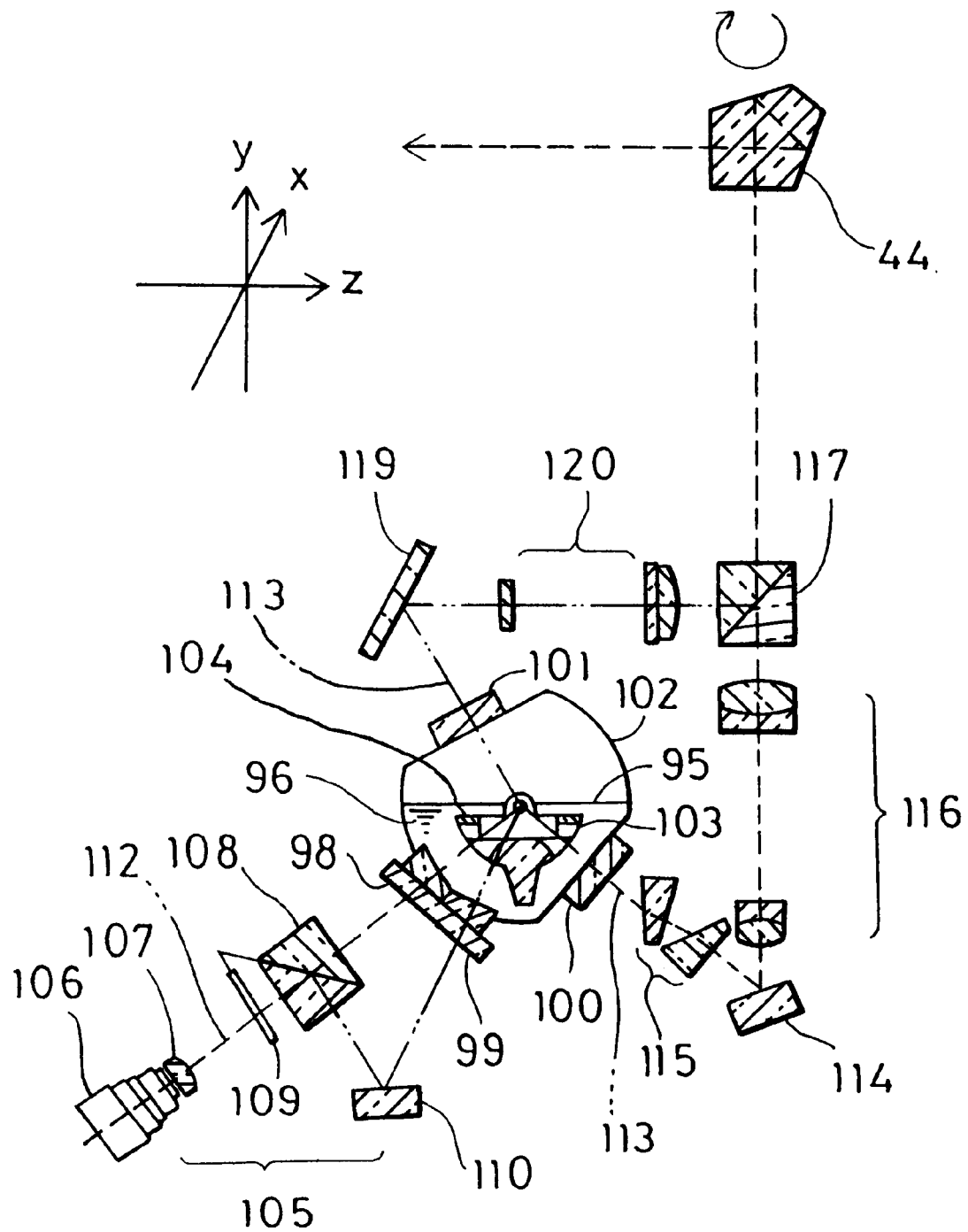
FIG. 5 is a schematical block diagram of a mechanism of an automatic angle compensation in the above embodiment.

As the light source of the light source unit 106, semiconductor laser having linearly polarized light is used to have the direction of polarization as linearly polarized, which is oscillated in parallel to x-axis as shown in FIG. 5. The polarizing plate of the $\lambda/2$ wave plate 109 is set in such manner that, when the incident light beam 112 from the light source unit 106 passes through the $\lambda/2$ wave plate 109, the direction of polarization is rotated by 90 and is turned to parallel to y-axis.

Opposite to the polarization beam splitter 108, a reflection mirror 110 is arranged, and the reflection mirror 110 reflects the light beam reflected by the polarization beam splitter 108 toward the second incident window 99. The polarization beam splitter 108 is designed in such manner that it allows an incident light beam 112 to pass, which passes through the $\lambda/2$ wave plate 109, i.e. an incident light beam 112 oscillating in parallel to y-axis, and that it reflects the incident light beam 112 not passing through the $\lambda/2$ wave plate 109, i.e. the incident light beam 112 oscillating in parallel to x-axis.

When entering the transparent liquid 96 through the first incident window 98, the incident light beam 112 passes through the liquid movement preventing plate 104 of the liquid movement preventer 103 and enters the free liquid surface 95 at a predetermined angle, e.g. at 50°, under the condition shown in FIG. 5. After being reflected by the free liquid surface 95, it passes through the liquid movement preventing plate 104 as a reflection light beam 113 and is irradiated through the first irradiation window 100. After entering the transparent liquid 96 through the second incident window 99, the incident light beam 112 passes through the liquid movement preventing plate 104 of the liquid movement preventer 103 and enters the free liquid surface 95 at a given angle, e.g. at 50°, under the condition shown in FIG. 6. The reflection light beam 113 reflected by the free liquid surface 95 passes through the liquid movement preventing plate 104 and is irradiated through the second irradiation window 101.

A reflection mirror 114 is provided, which reflects the reflection light beam 113 irradiated through the first irradiation window 100 in a vertical direction, and an anamorphic prism system 115 is arranged between the first irradiation window 100 and the reflection mirror 114. On the optical axis of the reflection light beam 113 reflected by the reflection mirror 114, a beam expander 116, a polarization beam splitter 117, and a rotary pentagonal prism 44 rotated by rotating means such as motor, etc. are arranged in this order.

At a position opposite to the second irradiation window 101, a reflection mirror 119 is arranged to guide the reflection light beam 113 irradiated through the second irradiation window 101 toward the polarization beam splitter 117, and a beam expander 120 is arranged between the polarization beam splitter 117 and the reflection mirror 119 so that the optical axis of the reflection light beam 113 reflected by the polarization beam splitter 117 agrees with the optical axis of the light beam, which has passed through the polarization beam splitter 117. The polarization beam splitter 117 is designed in such manner that it allows the light beam to pass, which oscillates in parallel to z-axis, and reflects the light beam oscillating in parallel to x-axis.

In the following, description will be given on operation.

After being irradiated from the light source unit 106 and passing through the λ/2 wave plate 109, the incident light beam 112 oscillating in y-axis direction passes through the polarization beam splitter 108 and enters the transparent liquid 96 through the first incident window 98 and is totally reflected by the free liquid surface 95. The reflection point of the transparent liquid 96 agrees or approximately agrees with the rotation axis of the liquid movement preventer 103.

Being reflected by the free liquid surface 95 of the transparent liquid 96, the reflection light beam 113 is irradiated through the first irradiation window 100, and after passing through the anamorphic prism system 115, it is reflected in a vertical direction by the reflection mirror 114. Further, it passes through the beam expander 116 and the polarization beam splitter 117 and is irradiated in a horizontal direction by the pentagonal prism 44.

As described above, the anamorphic prism system 115 equalizes reflection sensitivities on the free liquid surface 95 in all directions, and the beam expander 116 ultimately adjusts sensitivity. Therefore, the optical axis of the light beam passing through the beam expander 116 is always compensated in a vertical direction regardless of the tilting of the entire system. Accordingly, the reflection light beam 113 irradiated from the pentagonal prism 44 forms a horizontal reference line. By rotating the pentagonal prism 44, it is possible to obtain a horizontal reference plane, which is constant at all times. That is, the present invention can be applied for a leveler.

Next, description will be given on a case where the entire system is rotated by 90°, referring to FIG. 6.

The liquid movement preventer 103 is rotated by 90° so that the liquid movement preventing plate 104 is kept at a horizontal position. Because the free liquid surface 95 of the transparent liquid 96 is always kept in a horizontal direction with respect to the center of gravity, when the entire system is rotated by 90°, it is rotated by 90°. The λ/2 wave plate 109 is also rotated by 90° and it is deviated from optical path of the incident light beam 112. Therefore, the incident light beam 112 oscillating in x-axis direction enters the polarization beam splitter 108, and the incident light beam 112 is reflected toward the reflection mirror 110 by the polarization beam splitter 108. Being reflected by the reflection mirror 110 and entering through the second incident window 99, the incident light beam 112 is totally reflected by the free liquid surface 95. The reflection point of the incident light beam 112 on the transparent liquid 96 agrees or approximately agrees with rotation axis of the liquid movement preventer 103.

The reflection light beam 113 reflected by the free liquid surface 95 is irradiated through the second irradiation window 101 and is reflected by the reflection mirror 119 and passes through the beam expander 120. Further, it is reflected in a horizontal direction by the polarization beam splitter 117 and runs along the same optical axis as that of the reflection light beam before the entire system is laid down by 90°. Because the entire optical system is laid down by 90°, optical axis of the reflection light beam 113 reflected by the polarization beam splitter 117 is always kept in a horizontal direction. By rotating the pentagonal prism 44, the irradiated and formed reference plane is converted to a vertical direction, and it is possible to obtain a rotary irradiation plane, which is always maintained in a vertical direction in z-y plane regardless of the tilting of the entire system.

Figure 6:
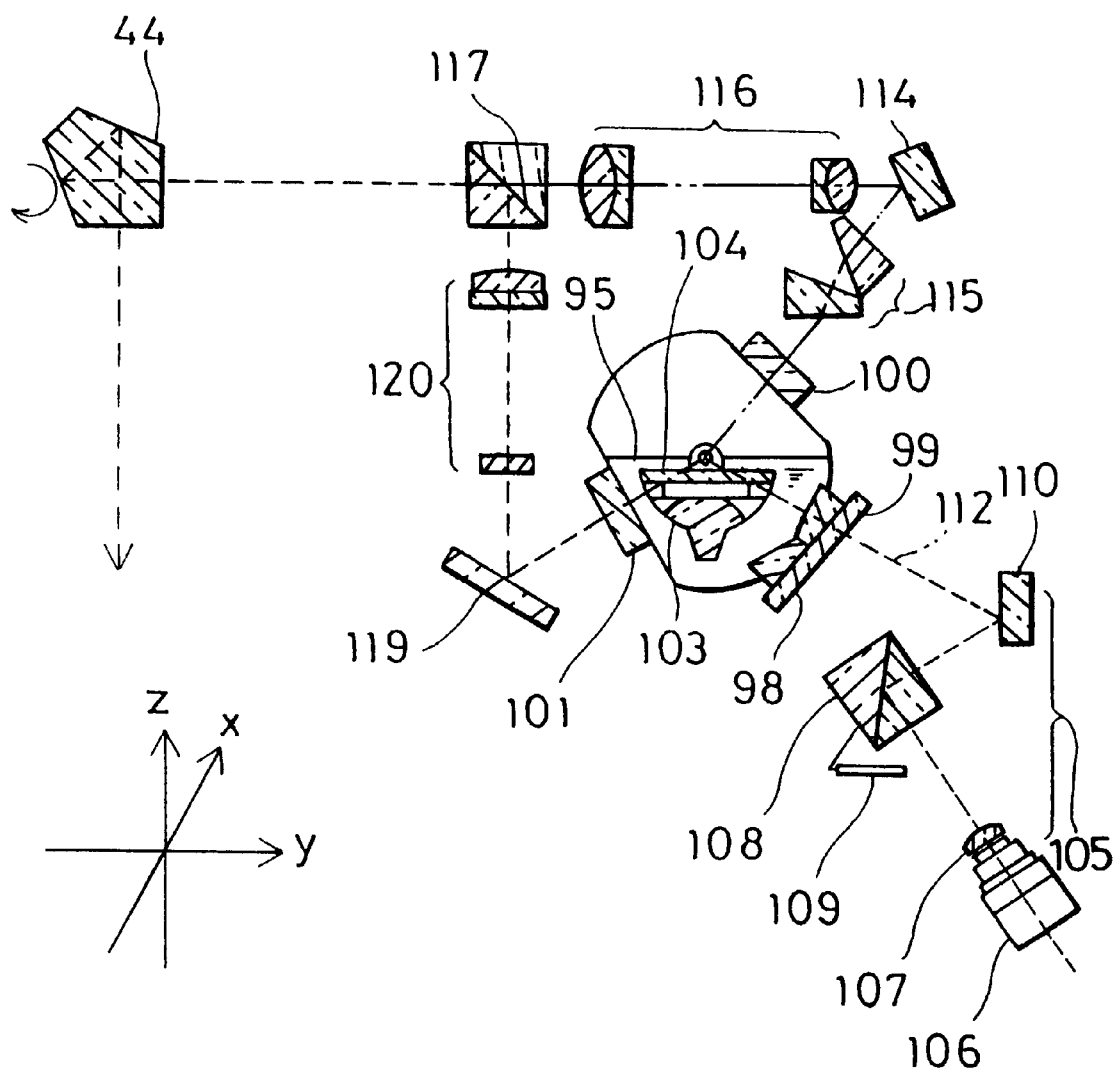
FIG. 6 is a schematical block diagram of a mechanism of an automatic angle compensation in the above embodiment.
Figure 7:
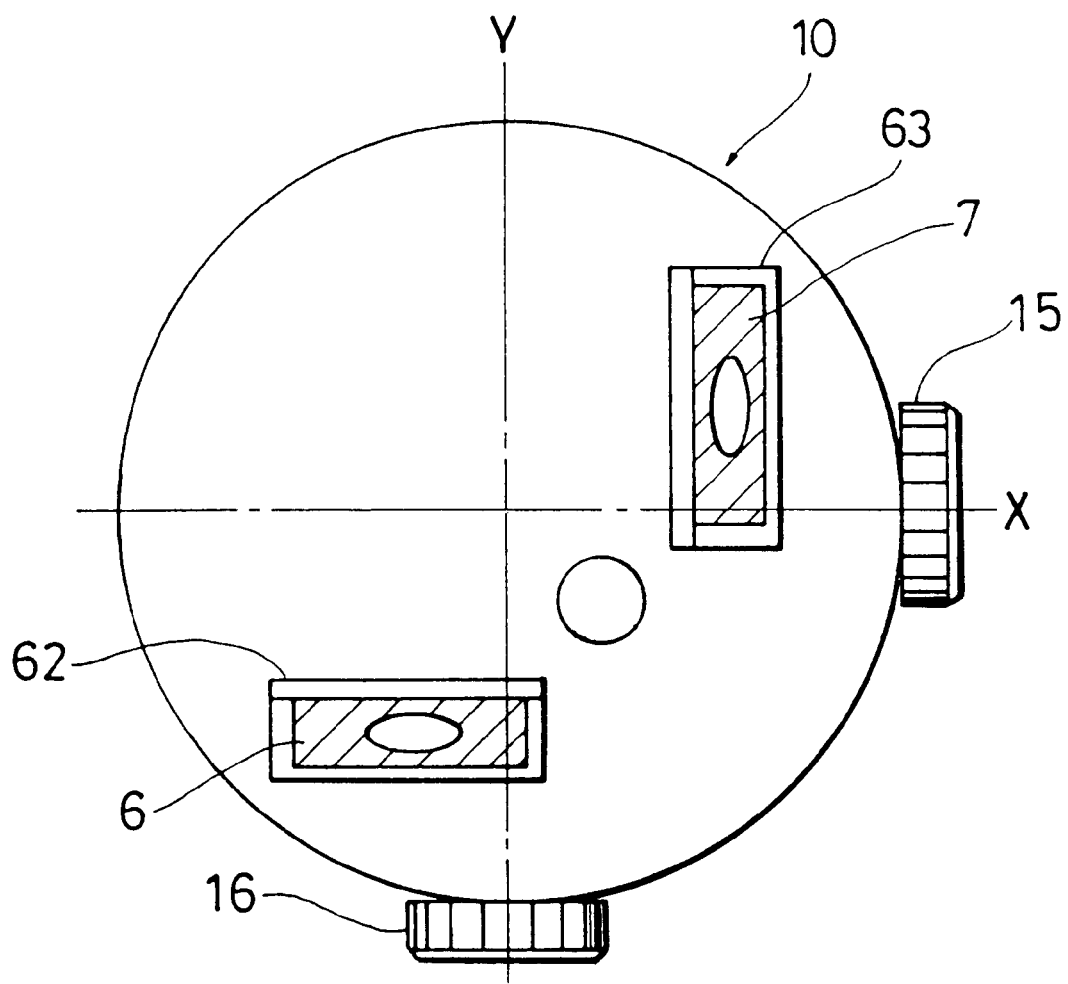
FIG. 7 is a plan view of a leveling base in the above embodiment.
Figure 8:
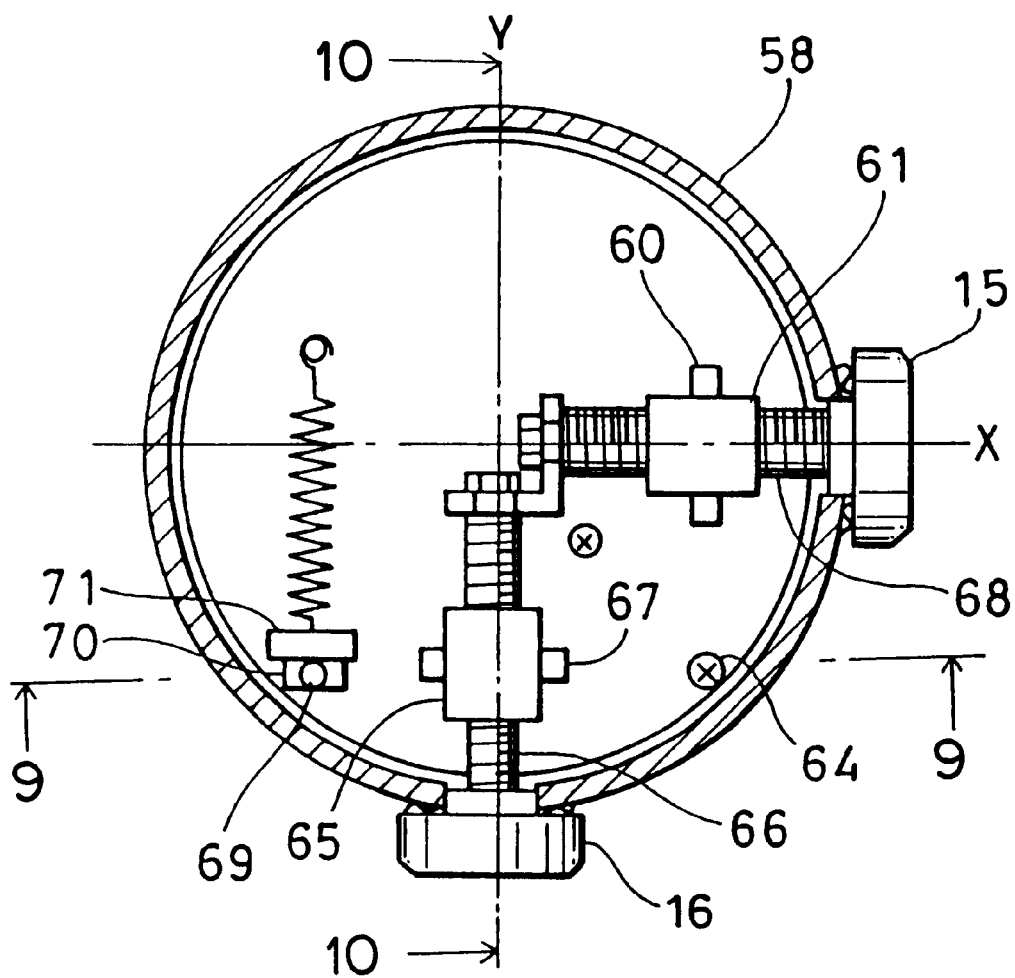
FIG. 8 is a horizontal sectional view of the leveling base of the above embodiment.

In this case, when the entire system is laid down by 90° as shown in FIG. 6, optical axis is compensated in a vertical direction on z-y plane, and no compensation of optical axis is performed on x-y plane. The reason for this is as follows: When a vertical irradiation plane is aligned with the reference point, the entire system is rotated to align with the reference, therefore it is more convenient if the movement in a rotating direction of the irradiation plane is slow when the system is installed.

Next, description will be given on the leveling base 10 referring to FIG. 7 to FIG. 10.

The leveling base 10 comprises a fixed frame 57 and a tilting base 58, which is tiltable with respect to the fixed frame 57, and the main unit 1 is mounted on the tilting base 58. An X-axis adjusting knob 15 aligned with X-axis of the leveling base 10 is provided, and a Y-axis adjusting knob 16 aligned with Y-axis is provided. On the top surface of the tilting base 58, a Y-axis circular bubble tube 7 in parallel to Y-axis is mounted via a circular bubble tube base 63, and an X-axis circular bubble tube 6 in parallel to X-axis is mounted via a circular bubble tube base 62. The circular bubble tubes 6 and 7 indicate tilting directions, and the tilting is detected by means separately provided on the main unit, e.g. by an electrical circular bubble tube.

When the X-axis adjusting knob 15 is rotated, the top surface of the tilting base 58 is tilted around an axis, which is in parallel to the axis of the X-axis adjusting knob 15, and the tilting can be detected by the Y-axis circular bubble tube 7. Similarly, when the Y-axis adjusting knob 16 is rotated, the top surface of the tilting base 58 is tilted around an axis, which is in parallel to the axis of the Y-axis adjusting knob 16, and this tilting can be detected by the X-axis circular bubble tube 6.

The rotating direction of the axis adjusting knob agrees with the tilting direction of the top surface of the tilting base 58, and the result of the rotation of the axis-adjusting knob appears on the circular bubble tube opposite to the axis adjusting knob, and the circular bubble tube also indicates the tilting direction of the tilting base 58.

The tilting base 58 is supported on the fixed frame 57 at three points, i.e. via a pivot shaft 64, an X-axis nut block 61 and a Y-axis nut block 65.

Description will be given on tilt adjustment in case the Y-axis adjusting knob 16 is rotated, referring to FIG. 9 and FIG. 10. For X-axis, a tilting adjusting mechanism for the fixed frame 57 having the same arrangement as that of Y-axis is provided.

Figure 9A:
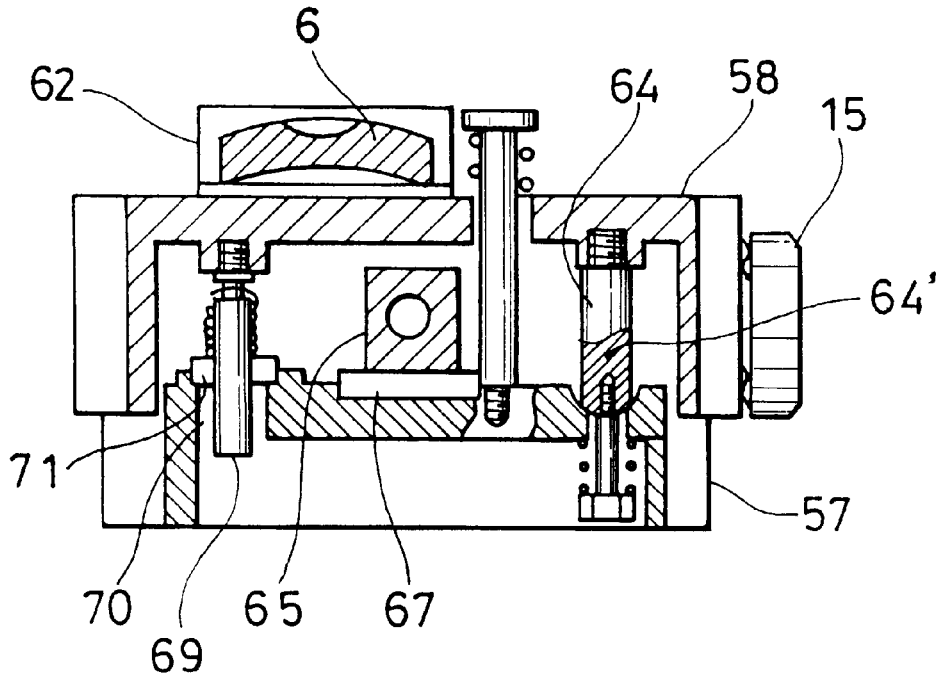
FIGS. 9 (A) and (B) each represents an arrow diagram along the line C—C in FIG. 8.
Figure 9B:
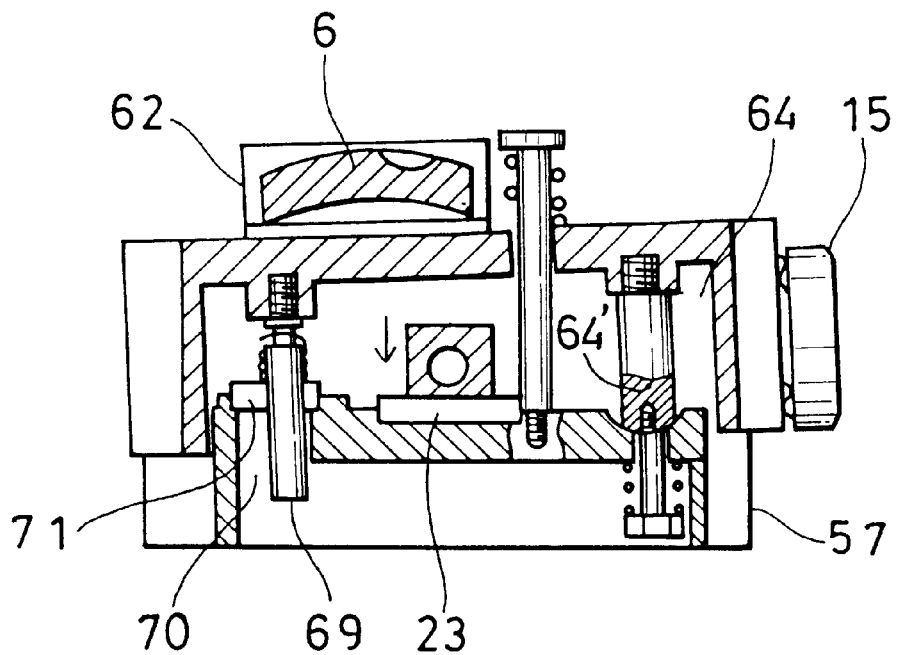
Figure 10A:
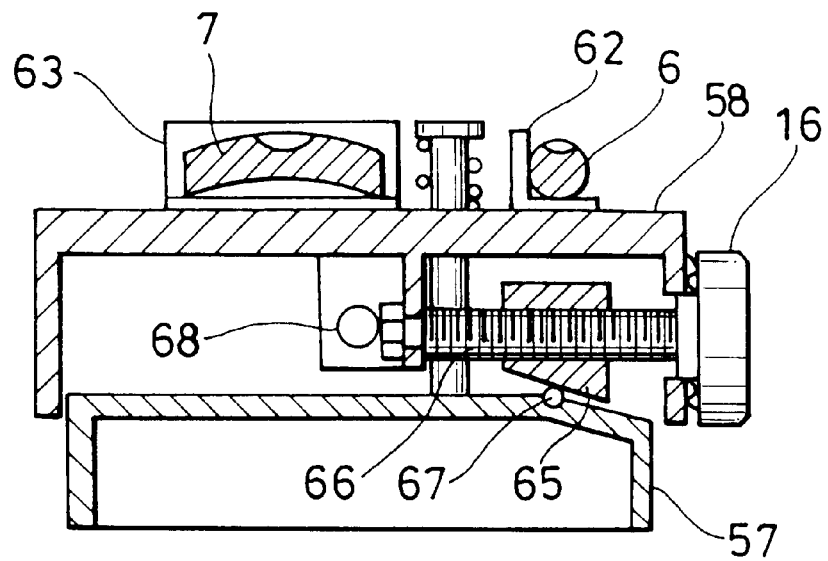
FIGS. 10 (A) and (B) each represents an arrow diagram along the line D—D in FIG. 8.
Figure 10B:
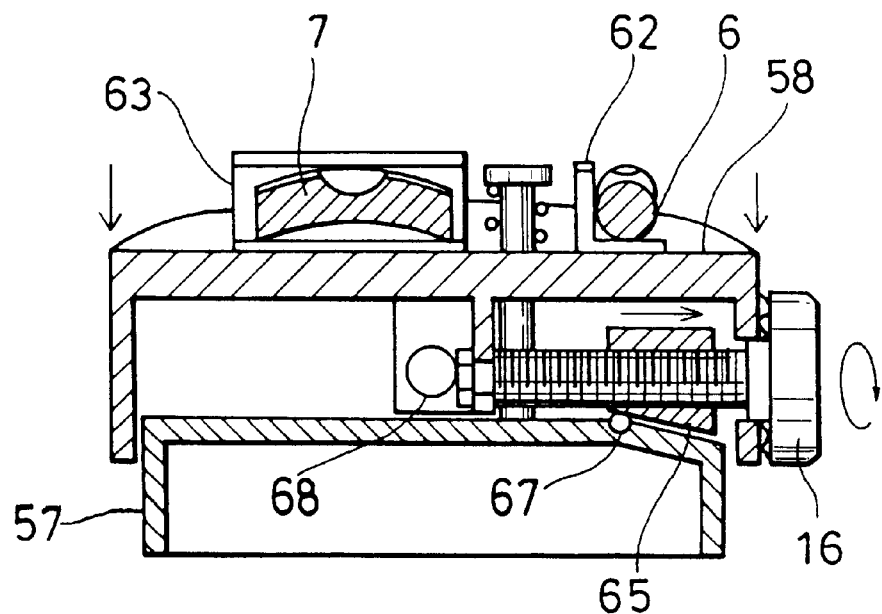

In case a Y-axis feeding screw 66 is a right-handed screw, and when the Y-axis adjusting knob 16 is rotated clockwise, the Y-axis nut block 65 advances in a direction perpendicular to the paper surface in FIG. 9 and moves in rightward direction in FIG. 10. Because the lower surface of the Y-axis nut block 65 is tapered, when the Y-axis nut block 65 is moved in the above direction, distance between a Y-axis slide pin 67 and axis of the Y-axis feed screw 66 decreases. With respect to the movement of the Y-axis nut block 65, the Y-axis nut block 65 is in linear contact with the Y-axis slide pin 67. As a result, a force to suppress rotation occurs between the two, and there is no need to provide a turn-stop for the Y-axis nut block 65.

When the X-axis adjusting knob 15 is not adjusted, of the three support points, only the height at the Y-axis nut block 65 changes. Therefore, the tilting base 58 is tilted around an axial line, which is formed by connecting a tilting center point 64' on the pivot shaft 64 to a contact point of the X-axis slide pin 60 and the X-axis nut block 61, i.e. an axial line in parallel to rotation axis of the Y-axis adjusting knob 16, and independent tilting adjustment can be performed with no interference with the adjustment of the X-axis adjusting knob 15. A turn-stop pin 69 is provided to suppress relative rotating displacement between the fixed frame 57 and the tilting base 58, and it is slidably engaged in a rectangular hole 70. The turn-stop pin 69 slides in a vertical direction with respect to the slide pin 71 by the extent of tilting of the fixed frame 57 and the tilting base 58 and suppresses rotation of the tilting base 58.

The rotating direction of the tilting base 58 is in parallel to the rotating direction of the Y-axis adjusting knob 16. In case the rotating direction of the Y-axis adjusting knob 16 is to be aligned with the tilting direction of the tilting base 58, it should be selected whether the Y-axis feeding screw 66 is designed as a right-handed screw or a left-handed screw.

The result of adjustment of the Y-axis adjusting knob 16 appears on the X-axis circular bubble tube 6, which is at a position opposite to an operator, and the operator can adjust tilting by watching the X-axis circular bubble tube 6 right ahead of him.

Similarly, when the X-axis adjusting knob 15 is rotated, the X-axis nut block 61 is moved by rotation of the X-axis feeding screw 68. When the X-axis nut block 61 is moved, the tilting base 58 is tilted around a line, which is formed by connecting the tilting center point 64' to a contact point of the Y-axis slide pin 67 and the Y-axis nut block 65, and independent tilting adjustment can be performed without interference of the Y-axis adjusting knob 16.

By rotating the Y-axis adjusting knob 16 and the X-axis adjusting knob 15, tilting of the tilting base 58 can be adjusted. Because rotating directions of the Y-axis adjusting knob 16 and the X-axis adjusting knob 15 agree with the tilting direction, it is possible to have sensory matching, and the operator can perform adjustment by watching the circular bubble tubes right ahead of him. This facilitates leveling operation of the tilting base 58.

Figure 11:
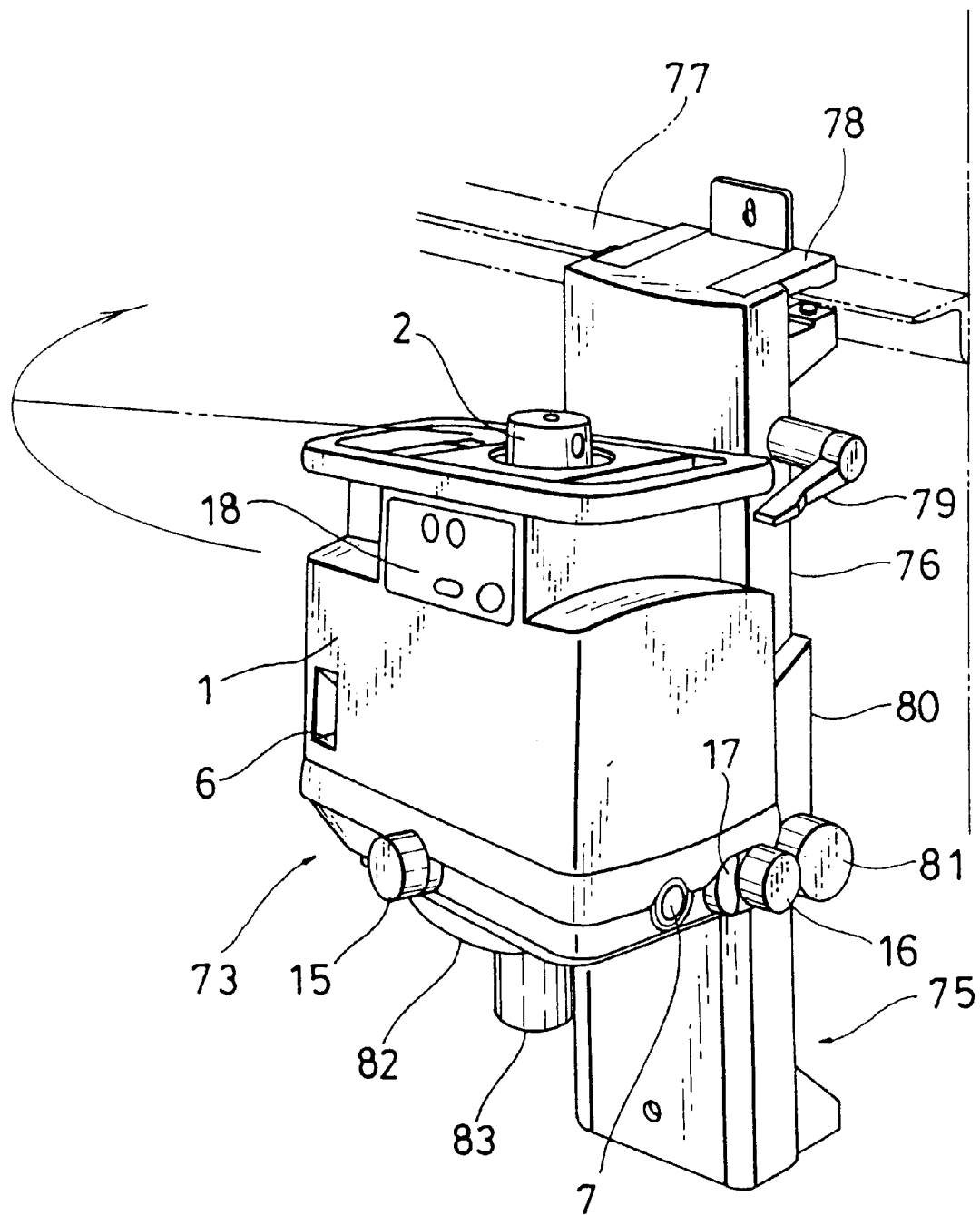
FIG. 11 is a perspective view of a laser leveling system of the present invention when it is installed using a wall mount.

Next, description will be given on a wall mount 75 in case a laser leveling system 73 of the present invention is mounted on a vertical surface such as wall surface, referring to FIG. 11.

On the upper end of a guide 76 extending in a vertical direction, a clamp 78 clasping a rib 77 mounted on the wall is mounted, and the clamp 78 is released from fixation when a clamp lever 79 is turned. On the guide 76, a slider 80 having a pedestal 82 is slidably engaged, and a vertical slide adjusting knob 81 is used to fix the guide 76 and the slider 80. The laser leveling system 73 is mounted on the pedestal 82 and is fixed by a fixing bolt 83 from below.

To fix the wall mount 75 on a vertical surface such as wall surface, it is fixed by the clamp 78 on the rib 77, and the laser leveling system 73 is mounted on the vertical surface such as wall surface via the wall mount 75. To adjust position of the laser leveling system 73 in a vertical direction, the adjusting knob 81 is turned to move up and down along the guide 76, and the adjusting knob 81 is fixed at an adequate position.

For adjustment and correction of a laser beam irradiating direction after the laser leveling system 73 has been mounted, as described above the adjusting knobs 15 and 16 are operated to adjust the circular bubble tubes. After rough adjustment, the compensator corrects and compensates the scanning laser beam in a horizontal direction.

Figure 12:
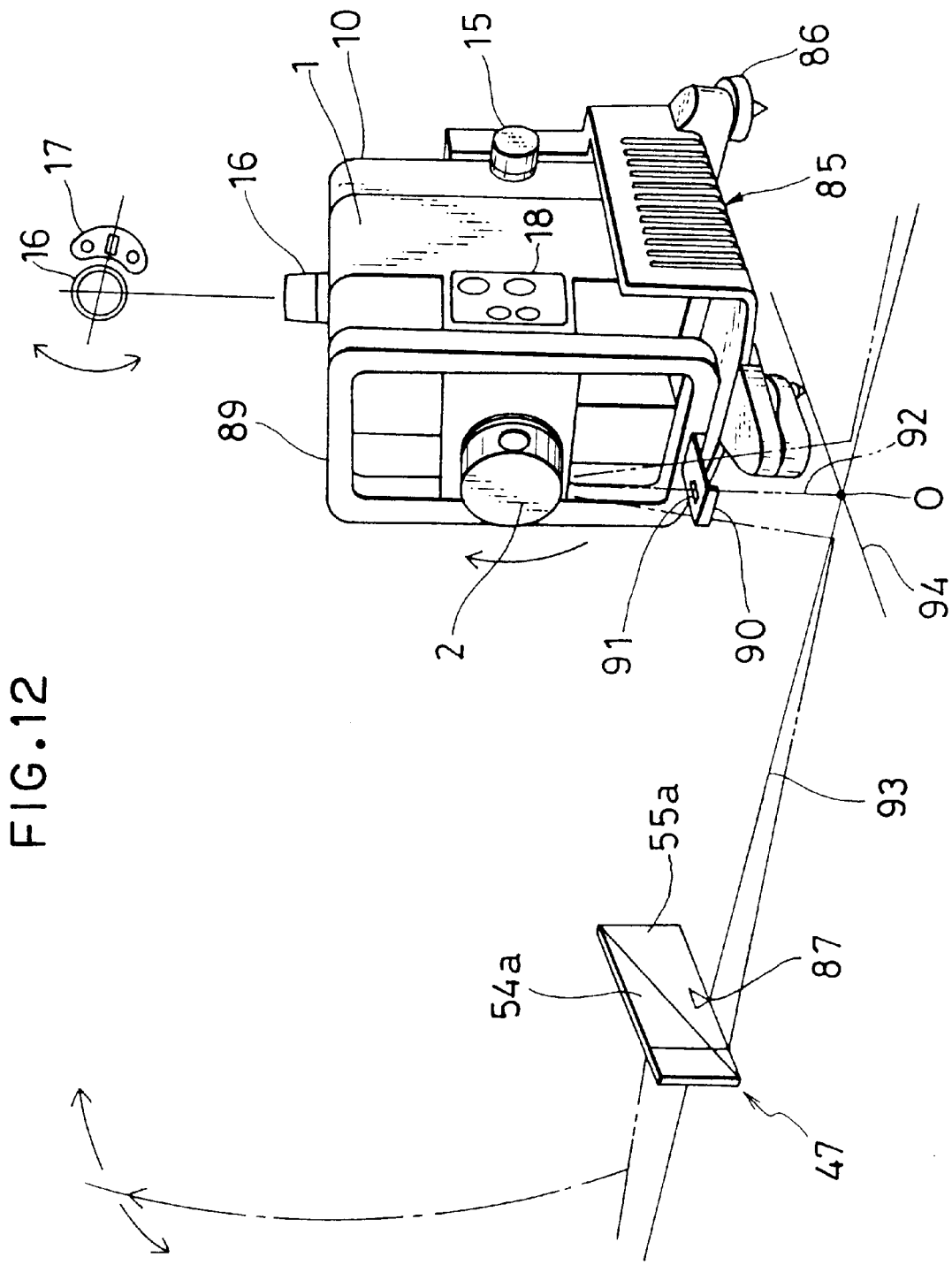
FIG. 12 is a perspective view of a laser leveling system of the present invention when it is installed using a floor mount.

FIG. 12 shows a case where the laser leveling system 73 is laid down horizontally to form a vertical reference plane.

In case the laser leveling system 73 is used by laying it down horizontally, a floor mount 85 is used. The laser leveling system 73 is mounted on the floor mount 85 and is installed on the floor surface. In case the laser leveling system 73 is installed while it is laid down horizontally, approximate posture adjustment is performed by the adjusting knob 15 and by a leveling screw 86 arranged on the floor mount 85. The adjusting knob 16 is used to adjust direction of the vertical rotary irradiation plane.

The floor mount 85 has at least one leveling screw 86, and horizontal positioning of the laser leveling system 73 mounted on the floor mount 85 is roughly performed by adjusting the leveling screw 86 and the adjusting knob 15 while watching the circular bubble tube 7. After rough adjustment, the scanning laser beam is compensated and adjusted in a vertical direction by the compensator as described above. A horizontal direction of scanning rotation axis of the vertical scanning laser beam is adjusted by the adjusting knob 16. A display unit 17 is arranged near the adjusting knob 16, and a rotating direction of the adjusting knob is displayed on the display unit by lamp so that the scanning laser beam is directed to a predetermined position of the object reflector as described later. When scanning of the laser beam comes to the predetermined position, a lamp to indicate the position is turned on.

The object reflector 47 is used for adjusting the irradiating direction of the laser beam.

An indicator mark 87 is put on the object reflector 47, and the indicator mark 87 is aligned with the marking line 93 marked on the floor surface. As described above, the irradiating position of the laser beam can be detected by the reflection light beams from the polarization maintaining reflection sector 54a and the polarization converting reflection sector 55a. Accordingly, the positioning can be achieved by detecting the light receiving condition of the reflection light beam from the object reflector 47. To perform positioning of an irradiation point vertically under the laser beam in relation to the reference point O, a spot is formed by the laser beam to have better visibility and to facilitate positioning. To form the spot, a slit plate 90 is provided.

On the slit plate 90, a slit 91 is formed at a position directly under the rotation axis of the rotating unit 2. When the laser beam scanning before and after the slit 91 is interrupted by the slit plate 90, a spot light is formed directly under the rotation axis of the rotating unit 2. The slit plate 90 is provided at a given position on the main unit 1. In the example shown in FIG. 12, it is provided on a frame grip 89.

To install the laser leveling system main unit 1, the spot light 92 is first aligned with the intersection point of marking lines 93 and 94 under the light emitting condition as described above, and a locus on the floor obtained by scanning of the laser beam is aligned with the marking line 93. It is needless to say that no special operation is required to stop rotation of the rotating unit 2 or to rotate it at lower speed when installing the laser leveling system main unit 1.

Figure 13:
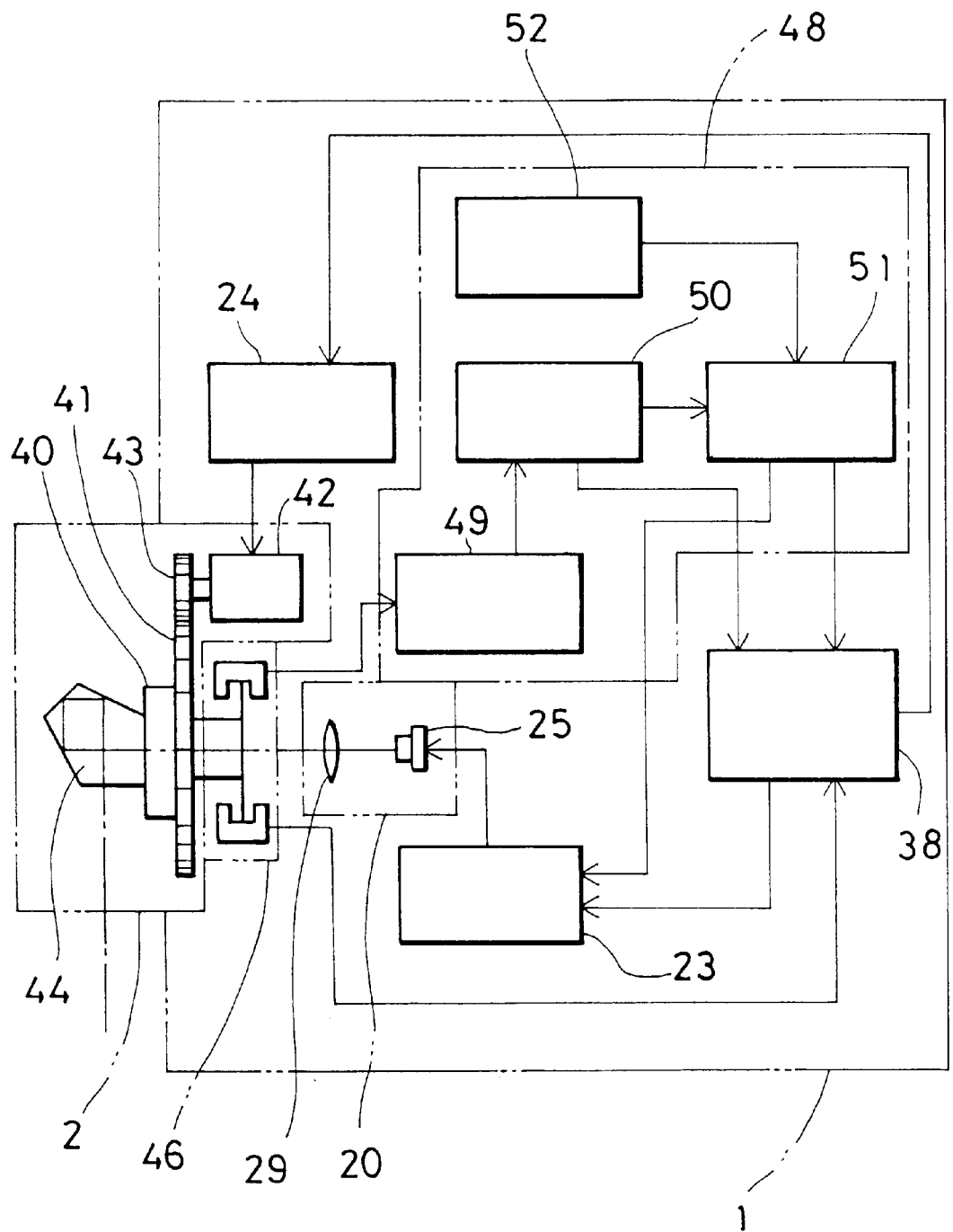
FIG. 13 is a schematical block diagram of another embodiment of the present invention.
Figure 14:
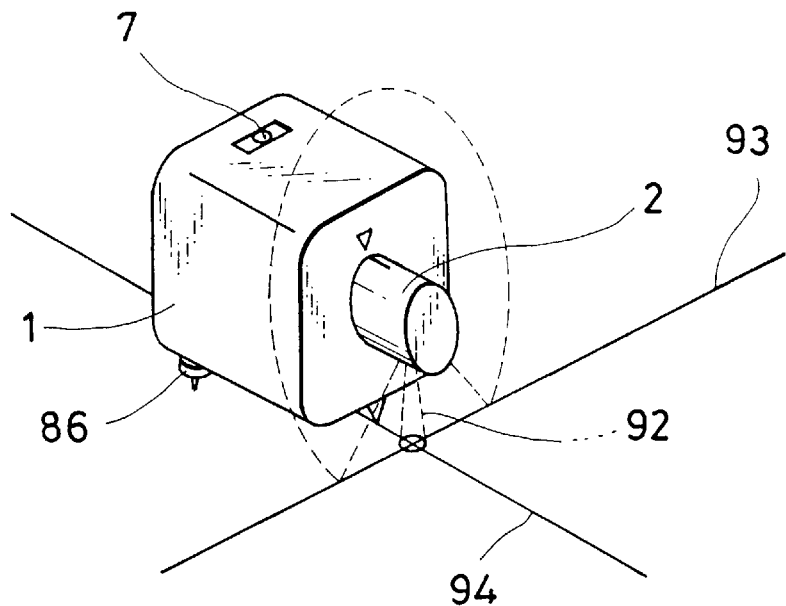
FIG. 14 is a drawing to explain said another embodiment of the invention.

To form the spot light, in addition to a method to physically interrupt before and after the slit 91 by the slit plate 90, there is a method to turn off light before and after the spot to form the spot on scanning locus of the laser beam or a method to turn off the light to form the spot. Description is given on a method to form the spot light by turning on or off light at a given position by encoder output, referring to FIG. 13 and FIG. 14. In FIG. 13 and FIG. 14, the same component element as in FIG. 3 is referred by the same symbol.

An angle detector 46 for detecting rotation of a rotation support member 40 is provided, and a light emitter 20 is arranged, which has an optical axis aligned with the rotation axis of the rotation support member 40. The angle detector 46 comprises a rotating disk and a detector. The rotating disk has angle detection slits provided over total periphery at equal angular pitch and a zero position detection slit provided only at one point on total periphery. The detector comprises an encoder for detecting the angle detection slits and for issuing angular pulse and an interrupter unit for detecting the zero position detection slits and for issuing a zero set signal. The light emitter 20 comprises a laser diode 25 and an optical system 29, and a laser beam emitted from the laser diode 25 is turned to parallel beam and is irradiated toward the pentagonal prism 44.

The main unit 1 has a signal processor 48. The signal from the angle detector 46 is inputted to the signal processor 48 and the signal from the signal processor 48 is inputted to the CPU 38. The CPU 38 issues control signals to alight emission controller 23 for driving the light emitter 20 and to a rotation controller 24 for driving a scanning motor 42 respectively.

The signal processor 48 further comprises an angle signal processor 49, a counter 50, a comparator 51, and a counter reference value setting unit 52. The signal from the angle detector 46 is inputted to the angle signal processor 49. In the angle signal processor 49, signal processing such as amplification is performed, and a pulse signal corresponding to the angle signal is inputted to the counter 50. The counter 50 counts number of pulses from the angle signal processor 49, and the number of counts is outputted to the comparator 51 and the CPU 38. To the counter reference value setting unit 52, any number of counts as desired can be set, and the numerical value thus set is inputted to the comparator 51. The comparator 51 compares the value set by the counter reference value setting unit 52 with the value from the counter 50. When the two values agree with each other, a coincidence signal is inputted to the CPU 38. The CPU 38 outputs a light emission control signal to the light emission controller 23, and light emission of the laser diode 25 is controlled by the light emission controller 23. Also, the CPU 38 issues a rotation control signal to the rotation controller 24 and controls the rotation of the scanning motor 42 via the rotation controller 24.

In the following, description will be given on operation, referring to FIG. 14.

Being emitted from the light emitter 20, the parallel laser beam is reflected in a direction perpendicular to the optical axis by the pentagonal prism 44 and is irradiated by the rotating unit 2. The pentagonal prism 44 is rotated by the scanning motor 42 via the driving gear 43 and the scanning gear 41. By scanning operation of the laser beam irradiated from the pentagonal prism 44, a vertical reference plane is formed by the laser beam.

The zero set signal from the interrupter unit of the angle detector 46 is set in such manner that it is issued at a given angle, e.g. at 30°, before the position where the laser beam is irradiated directly under and along the vertical line, and the zero set signal is inputted to the CPU 38 via the counter 50.

When the zero set signal is inputted to the counter 50, the counter value on the counter 50 is set to zero. By the counter reference value setting unit 52, the following three count values are inputted to the comparator 51: a first preset count value corresponding to an angle less than 30° and closer to 30°, a second preset count value corresponding to a small angle near and including 30°, and a third preset count value corresponding to 60°.

When the zero set signal is inputted to the CPU 38 by the counter 50, a turn-off signal is issued to the light emission controller 23 and light emission of the laser diode 25 is stopped. The comparator 51 compares the signal from the counter 50 with the preset value from the counter reference value setting unit 52. When the number of counts agrees with the first preset count value, a first coincidence signal is issued to the CPU 38. Based on the first coincidence signal, the CPU 38 issues a light emission control signal to the light emission controller 23, and a laser beam is emitted from the light emitter 20.

Next, when the signal from the counter 50 agrees with the second preset count value, the comparator 51 issues a second coincidence signal to the CPU 38. Based on the second coincidence signal, the CPU 38 issues a control signal to the light emission controller 23, and light emission of the light emitter 20 is stopped. Further, when the number of counts agrees with the third preset count value, the comparator 51 issues a third coincidence signal to the CPU 38. Based on the third coincidence signal, the CPU 38 irradiates a laser beam from the light emitter 20 via the light emission controller 23. As shown in FIG. 14, the laser beam is emitted in spot-like form vertically downward.

As described above, to facilitate installation of the system, a laser beam is emitted in spot-like form and the object reflector can be detected in the present invention. Further, to facilitate visual recognition, it is possible to reciprocally operate or to stop rotation. In case the laser leveling system is to be installed or the irradiating direction of the laser beam is to be adjusted or changed after installation, operation can be easily performed because the adjusting direction is consistent with the operating direction. Because a display unit for indicating adjustment condition is provided near the adjusting knob, the operator can visually confirm the operating condition and this contributes to improvement of maneuverability. Because the circular bubble tubes can be seen not only from above but also from lateral directions or from below, limitation of the installing position of the laser leveling system can be extensively reduced.

What we claim are:

1. A laser leveling system, comprising a laser light emitting means for emitting a laser beam, said laser beam forming a horizontal reference plane and a vertical reference plane, a projection optical system for projecting the laser beam irradiated from said light emitting means, a rotating unit for rotating the light beam projected from said projection optical system, said rotated light beam forming a reference irradiation spot in said horizontal reference plane or in said vertical reference plane, a light receiving means for receiving the laser beam reflected from an object reflector arranged on the optical path of the projected laser beam, a signal processor for detecting said object reflector by a signal from said light receiving means, and a leveling means for tilting the rotating unit.

2. A laser leveling system according to claim 1, wherein there is provided a tilting display means interlocked with said leveling means and used for indicating tilting of the rotating unit.

3. A laser leveling system according to one of claim 1, wherein said leveling means is a tilting mechanism designed to tilt in two axial directions, and a rotation axis of an adjusting knob is set in parallel to a rotation axis of tilting.

4. A laser leveling system according to claim 1, wherein the reference irradiation spot is formed by a slit arranged on the optical path of the rotating light beam.

5. A laser leveling system according to claims 1, wherein there are provided said rotation angle detecting means and said control means, and the rotating unit is operated for reciprocal scanning or stopped by said control means based on a signal from said rotation angle detecting means.

6. A laser leveling system according to claim 1, wherein an angle compensator is provided to maintain the light beam irradiated from said light emitting means in vertical or horizontal directions regardless of tilting of the entire system.

7. A laser leveling system according to one of claim 1, wherein a laser beam running perpendicularly to said horizontal reference plane or said vertical reference plane is irradiated.

8. A laser leveling system according to claim 1, wherein the rotating unit is controlled based on a signal from said light receiving means.

9. A laser leveling system according to claim 1, wherein a display means is provided to indicate information from the object reflector detected by said signal processor.

10. A laser leveling system according to claim 1, wherein a display means is provided for indicating an operating direction of said leveling means so as to make a laser beam pass through a given position on said object reflector.

11. A laser leveling system according to claim 1, wherein a frame grip is provided around said rotating unit to protect the rotating unit.

12. A laser leveling system according to claim 1, wherein a wall mount is provided, which has a clamping means for clamping a fixed object and a guiding means for supporting the main unit to move up and down so that a laser beam can be irradiated for rotary scanning in a horizontal direction.

13. A laser leveling system according to claim 1, wherein there is provided a floor mount for supporting the main unit so that a laser beam can be irradiated in a vertical direction for rotary scanning, and said floor mount has at least one leveling screw.

14. A laser leveling system according to one of claim 1, wherein bubble tubes are arranged on the main unit, mirrors are provided opposite to the bubble tubes, and said bubble tubes can be visually checked directly or through the mirrors.

* * * * *